United States Patent [19]

Deeds

[11] Patent Number: 5,227,172

[45] Date of Patent: * Jul. 13, 1993

[54] CHARGED COLLECTOR APPARATUS FOR THE PRODUCTION OF MELTBLOWN ELECTRETS

[75] Inventor: William E. Deeds, Knoxville, Tenn.

[73] Assignee: Exxon Chemical Patents Inc., Linden, N.J.

[*] Notice: The portion of the term of this patent subsequent to Jun. 16, 2009 has been disclaimed.

[21] Appl. No.: 699,930

[22] Filed: May 14, 1991

[51] Int. Cl.$^5$ ............................................. B29C 71/04
[52] U.S. Cl. ..................................... 425/72.2; 264/22; 425/174.8 E; 425/464
[58] Field of Search ............ 264/22, 24, 26, DIG. 48; 425/72.2, 131.5, 174, 174.6, 174.8 E, 174.8 R, 464

[56] References Cited

U.S. PATENT DOCUMENTS

| | | | |
|---|---|---|---|
| 2,116,942 | 5/1938 | Formhals | 425/174.8 E |
| 3,593,074 | 7/1971 | Isakoff | 425/72.2 |
| 4,009,508 | 3/1977 | Sternberg | 425/174.8 E |
| 4,215,682 | 8/1980 | Kubik et al. | 425/174.8 E |
| 4,594,203 | 6/1986 | Hagiwara et al. | 425/174.8 E |
| 4,650,411 | 3/1987 | Hassmann et al. | 425/174.8 E |
| 4,904,174 | 2/1990 | Moosmayer et al. | 425/174.8 E |
| 5,051,159 | 9/1991 | Togashi et al. | 264/22 |
| 5,122,048 | 6/1992 | Deeds | 425/72.2 |

*Primary Examiner*—Scott Bushey
*Attorney, Agent, or Firm*—R. L. Graham

[57] ABSTRACT

The apparatus of the present invention employs a collector drum with an electrically charged surface for use in preparing electrically charged meltblown fibrous webs. The apparatus may be used as a primary charging system or, alternatively, with other charging system to enhance the charging of the web. The invention produces webs with exceptional filtration properties.

6 Claims, 1 Drawing Sheet

CHARGED COLLECTOR APPARATUS FOR THE PRODUCTION OF MELTBLOWN ELECTRETS

BACKGROUND OF THE INVENTION

This invention relates generally to a process and apparatus for producing electrically charged nonwoven webs. In one aspect, the invention relates to the manufacture of electrically charged meltblown fibrous materials in which the charge is applied during the meltblowing process. In another aspect, the invention relates to electrically charging meltblown fibers using a collector apparatus with an electrically charged surface.

Meltblowing is a one step process in which a molten thermoplastic is extruded to form a plurality of fibers. Converging sheets of high velocity air blow the fibers onto a collector surface where they are entangled and collected forming a nonwoven web. These webs, called meltblown nonwoven fabrics, have excellent properties for many uses, one of which is filtration of gases and liquids.

The microscopic diameters of the entangled fibers of the meltblown web are ideally suited for filtering finely divided particles out of a gaseous or liquid media. The filtration efficiency of these nonwoven materials can be improved by applying a persistent electrostatic charge to the fibers. The charged webs are frequently called electrets. U.S. Patents which disclose nonwoven fibrous electrets include U.S. Pat. Nos. 4,215,682, 4,375,718, 4,588,537, 4,592,815. A process for applying the electric charge to the molten or hot fibers during the meltblowing process is disclosed in U.S. Pat. No. 4,215,682. The electrostatic charging of the fibers in the hot or molten state of the polymer permits the charges to migrate into the polymer(since its electrical resistance is lower then) and remain trapped upon cooling or crystallizing of the polymer. This increases the charge life of the electret.

In the process disclosed in U.S. Pat. No. 4,215,682 the charging is achieved by passing the extruded fibers through an intense electrostatic field. The electrostatic field, or corona zone, is established near the die tip using high voltage electrodes. The charged fibers are collected on a collector screen for forming the web.

Collection of the charged fibers on an electrically conductive and grounded screen can cause the fibers to lose their charge and can cause the fibers to pack more densely. Loss of charge may also lower the filtration efficiency.

SUMMARY OF THE INVENTION

The apparatus and method of the present invention employs a collector apparatus with an electrically charged surface for charging the fibers which form the web. The present charged collector apparatus can be used with a conventional meltblowing die to produce nonwoven fibrous electrets. The present invention may also be used with meltblowing lines equipped with other charging means. In this mode of operation, the invention will apply additional charges to the fibers as they are collected. Thus, the apparatus of the present invention can function as the sole charging system or can be used with other charging means.

In accordance with the present invention an apparatus for producing electrically charged meltblown webs includes a collector drum with an electrically charged surface for collecting and charging the meltblown fibers in forming the web. The surface may comprise a sheet of any electrically conductive material such as aluminum or copper. Although the charged surface may be an air permeable screen, it is preferable to use a nonporous sheet as this tends to produce a softer web.

The charge on the collector surface can be established by connecting a power supply to the surface through electrical brushes or slip rings. The brushes permit the charge on the surface to be maintained continuously as the drum rotates. For safety, the charged surface should be electrically insulated from other collector drum components. This can be achieved by placing beneath the conductive charging surface a layer of insulating material with suitable dielectric properties. Insulating materials such as polyethylene or polypropylene film can be wrapped around the collector drum and used for this purpose.

Results of filtration efficiency tests indicate that charging the collector surface according to the present invention improves the filtration efficiency. Two sets of tests were conducted. In the first set, webs were produced using a conventional meltblowing die and the present charged collector apparatus functioning as the sole charging system. In the second set, the charged collector apparatus was used with a meltblowing die equipped with a prior art charging system wherein the extruded fibers are charged as they exit the die tip (prior to being collected). In both sets of tests the filtration efficiency was improved by employing the charged collector surface apparatus of the present invention.

Although the present invention is described in relation to producing webs for filtration applications, electrically charged webs may have other applications. The filtration efficiency test is an effective test for determining the charge of the webs, even if the webs are used for other applications.

Charging the collector surface can also affect the tactile properties of the fabric. As the molten polymer flows through the die it receives electrons through the grounded metal walls of the die. This phenomenon is known as triboelectrification. As a result the extruded polymer fibers exiting the die tip are charged to a negative polarity. A positively charged collector surface will tend to attract the negatively charged extruded fibers and a tightly bound web is formed. A negatively charged collector will tend to repel the extruded fibers and a fluffier web is produced. For filtration applications a fluffier web will generally have a lower pressure drop across the filter.

DESCRIPTION OF PREFERRED EMBODIMENTS

Figure 1:
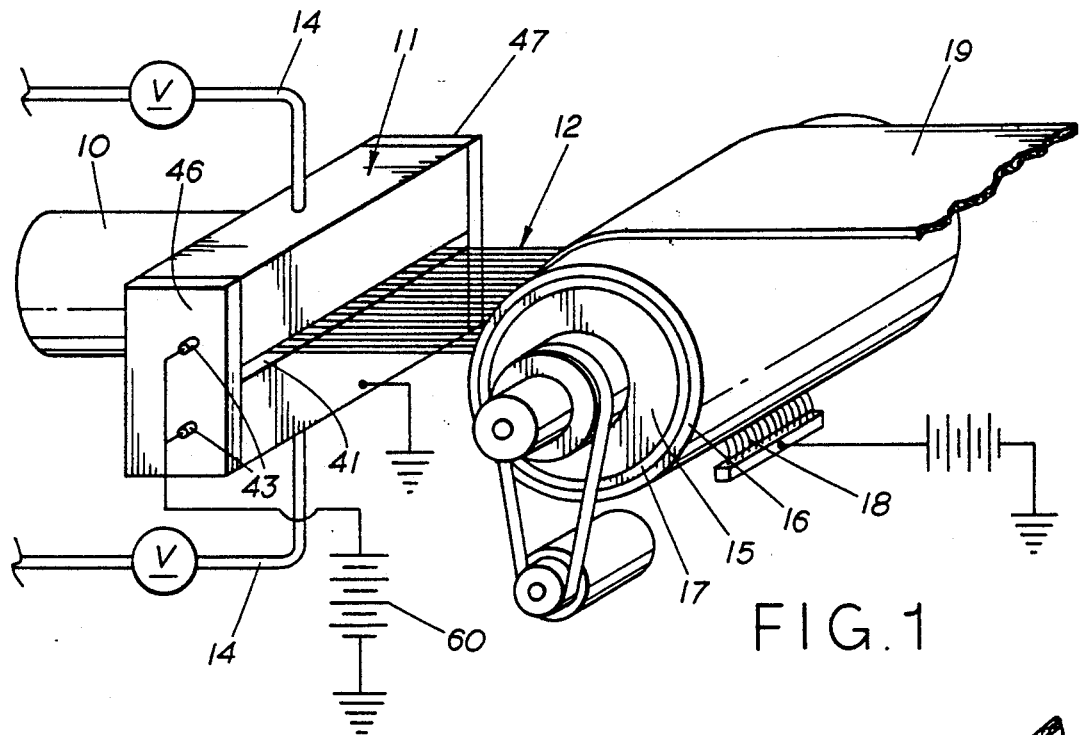
FIG. 1 is a schematic illustrating the main components of a meltblowing line and the electrostatic charging collector drum apparatus of the present invention.
Figure 2:
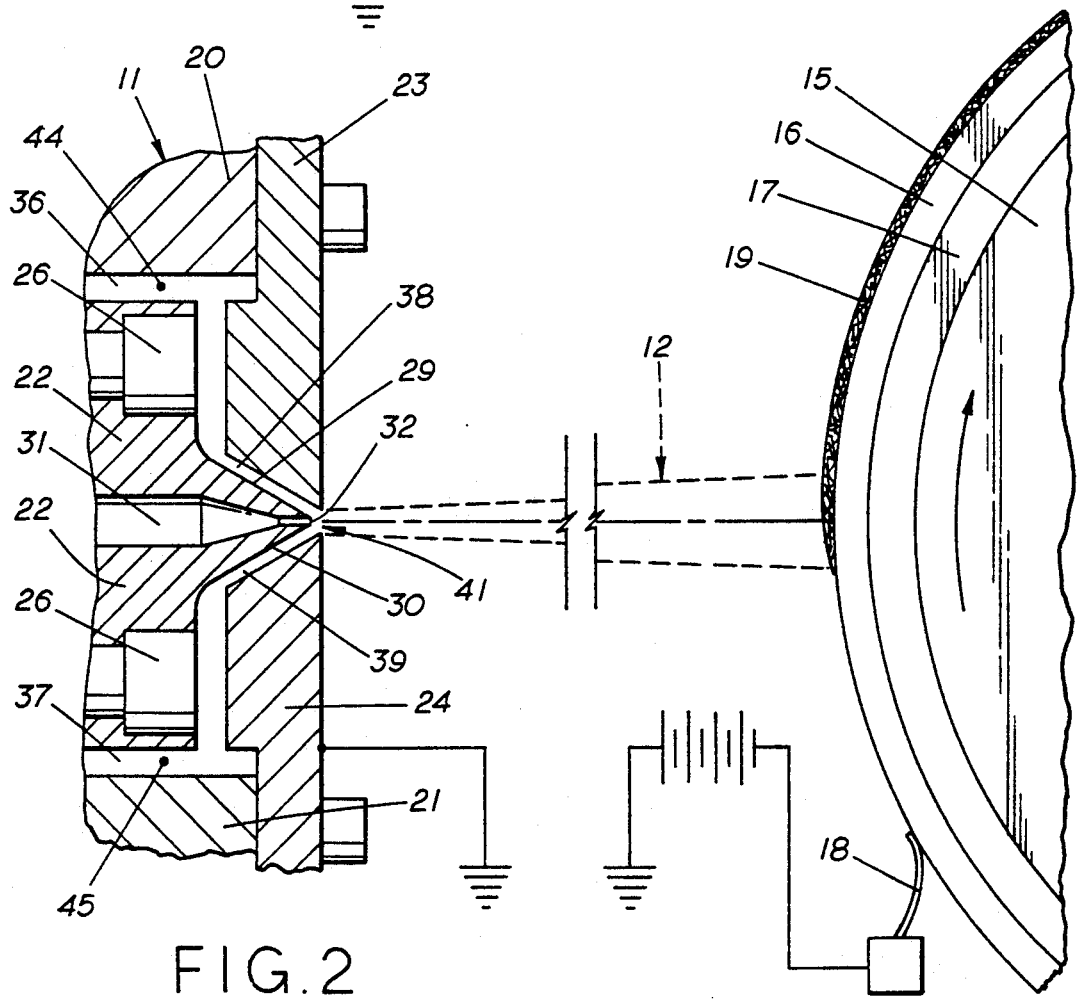
FIG. 2 is a cross-sectional view of a meltblowing die with electrostatic charging illustrating the flow of fibers onto the present charged collector drum apparatus.

As mentioned previously, the present invention relates to an apparatus and method for applying an electrostatic charge to meltblown fibers wherein the charge is applied by a collector means (e.g. a rotating drum) with an electrically charged surface. The present invention is described below in two modes of operation. In FIG. 1 the invention is embodied in use with a conventional meltblowing die and functions as the sole charging means for producing electrically charged webs. In FIG. 2 the invention is embodied in use with the meltblowing die of FIG. 1 wherein the die has been provided with the charging apparatus disclosed in U.S. patent application Ser. No. 586,901(filed 24 Sep. 1990) now U.S. Pat. No. 5,122,048. In this mode of operation, the charged collector apparatus of the present invention serves to apply additional charges to the fibers as they are collected. The present invention may also be used with other charging apparatus for producing charged fibrous webs such as those disclosed in U.S. Pat. No. 4,215,682, and U.S. Pat. No. 4,904,174. The disclosure in U.S. patent application Ser. No. 586,901, now U.S. Pat. Nos. 5,122,048, 4,904,174 and 4,215,682 are incorporated herein by reference. The present invention contemplates use in any meltblowing process for producing charged webs wherein the the fibers are charged before they are collected.

A meltblowing line is illustrated in FIG. 1 as comprising an extruder 10 for delivering molten resin to a meltblowing die 11 which extrudes fibers into converging hot air streams discharging a fiber-air stream 12 from the die discharge opening. The fiber-air stream 12 flows onto a rotating collector drum 15 for separating the fibers and air. The typical meltblowing line will also include means (not shown) for heating the polymer to the meltblowing temperature and an air source connected to the die 11 through valved lines 14.

In accordance with the present invention, the collector drum 15 is provided with electrostatic charging means 16 as the collector surface. The means may comprise a nonporous sheet of aluminum, copper, or any other material with suitable electrical conductivity. The charging means 16 may also be a screen if a vacuum is to be applied to the fibers during collection. An electrostatic charge is established on charging surface 16 using a high voltage power supply connected to the charging surface through electrical brushes 18. The power supply may have either a positive or negative polarity and may apply a charge to surface 16 in the range of −25 kV to +25 kV. The brushes 18 permit the electrostatic charge to be maintained continuously as the collector drum rotates. A slip-ring assembly may alternatively be used for this purpose. For safety, the charging surface 16 is electrically insulated from other collector parts by insulating layer 17. The insulating layer may be of polyethylene, polypropylene, or other insulating material. The deposited fibers receive charges from the charging means 16 by electrical conduction and an electrostatically charged fibrous web 19 is withdrawn. Because of the charge applied to the collector surface 16, an electrostatic field may also exist in the region between the collector surface and the grounded die body. The fibers may receive charges before depositing as they flow from the die to the collector through said electrostatic field.

As shown in FIG. 2, the die 11 includes an elongate die nosepiece 22 secured to the die body and air knives 23 and 24. The nosepiece 22 has a converging section 29 of triangular cross section terminating at tip 30. A central elongate passage 31 is formed in the nosepiece 22 and a plurality of side-by-side orifices 32 are drilled into the tip 30. Molten polymer is delivered to the extruder through die passage 31, and extruded as microsized side-by-side fibers from the orifices 32. During passage through the metal die, the polymer generally acquires some negative charges by triboelectrification.

The air knives 23 and 24 with nosepiece 22 define converging air passages 38 and 39. Heated air is delivered from an air source via lines 14 through the air passages and is discharged onto opposite sides of the molten fibers as converging sheets of hot air. The converging sheets of hot air draw or attenuate the fibers forming a fiber and air stream 12 discharging from the die discharge 41.

In accordance with the apparatus and method disclosed in U.S. patent application Ser. No. 586,901, now U.S. Pat. No. 5,122,048, the meltblowing die shown in FIG. 2 is provided with means for applying electrostatic charges to the fibers as they discharge from the die discharge opening 41. The electrostatic charges are applied by charging and ionizing the convergent hot air streams which flow through air flow passages 36 and 37. The electrically charged air streams converge at die discharge 41 and mix with the extruded fibers exiting from die orifices 32. The charged air molecules attempt to neutralize themselves by exchanging charges with the extruded fibers. The charges become trapped within the fibers upon solidifying.

The air streams are charged inside flow channels 36 and 37 by two high voltage electrodes 44 and 45 fixed therein. The electrodes 44 and 45 may be small diameter, electrically conductive(metal) wire or slender rods oriented transversely the air flow direction. In addition, the electrode wires may span the breadth (direction perpendicular to the plane of FIG. 2) of the air flow passages 36 and 37.

In operation, the electrodes 44 and 45 are electrically insulated from the die body components, and the die body components are electrically grounded. A high voltage source is connected to electrodes 44 and 45(top/bottom) and the polarity controlled so that the electrodes may have a +/+ charge, +/− charge, or a −/− charge configuration. The electrodes charge the air to the same polarity applied to the electrode by pulling charges of opposite sign out of the air.

The electrodes 44 and 45 are insulated from the die body components using insulating bushings 43 (indicated in FIG. 1) located in die body side panel 46. A similar set of bushings are located on opposing die body side panel 47. The bushings are made substantially from a dielectric material. The bushings also provide supporting means for mounting the electrode wires 44 and 45 in tension. This is necessary to ensure that the electrodes do not short-out against the inner walls of air flow passages 36 and 37 due to deflections of the electrodes caused by aerodynamic loading. Electrode diameters of 0.002 to 0.03 inches are preferred and those of 0.005 to 0.02 inches are most preferred. The smaller the diameter, the lower the voltage needed to ionize the air.

The electrode wires are located in the air flow passages 36 and 37 and spaced a sufficient distance from the walls to prevent arcing. This will depend on the voltage and the spacing of the electrode to the air passage walls. A general guideline is to provide 0.1 inch spacing per 3500 volts. Each electrode wire may be charged independently to a polarity in the range −25 kV to +25 kV. In some applications where arcing is a problem the electrode charging range may be limited to −10 kV to +10 kV.

In accordance with the present invention, electrostatically charged fibers flow onto the collector drum 15 and deposit on the electrostatic charging surface 16. Although the fibers have already received charges from the ionized air streams as described above, they will receive additional charges from the charged collector surface 16. The flow of charges from the surface to the deposited fibers is by electrical conduction. The collector surface 16 may be charged to either a positive or negative voltage in the range −25 kV to +25 kV. The charged collector surface may be charged to either the same or the opposite polarity as the charging wires for charging the air streams inside the die. As previously stated, the fibers may also receive charges in the electrostatic field between the charged collector surface and the grounded die body, said electrostatic field being established by charging the collector surface.

Although the present invention has been described in relation to the charging system disclosed in U.S. Pat. application Ser. No. 586,901, now U.S. Pat. No. 5,122,048 it may also be used with other charging systems such as that disclosed in U.S. Pat. No. 4,215,682 or U.S. Pat. No. 4,904,174, the disclosure of all three patents are incorporated herein by reference.

OPERATION

In operation, the present charged collector apparatus will be used with a meltblowing line. The line may employ any of the thermoplastic resins capable of use in meltblowing. The preferred polymer is polypropylene, but other polymers may be used such as low and high density polyethylene, ethylene, copolymers (including EVA copolymer), nylon, polyamide, polyesters, polystyrene, poly-4-methylpentene, polymethylmethacrylate, polytrifluorochloroethylene, polyurethanes, polycarbonates, silicones, and blends of these.

The meltblowing line produces fibers less than 10 microns in diameter, typically 1 to 5 microns.

The line may employ other electrostatic charging systems. In this event, the line is started and once steady state operation is achieved, said electrostatic charge system may be activated.

A rotating collector drum includes an electrically conductive surface and means for electrically charging the collector surface. The collector is located in the meltblown fiber-air steam. The charged collector surface may be charged with either a positive or a negative polarity and should be insulated from other collector components for safety. The line is started and once steady state is achieved, the charge on the collector surface may be applied. The rate of rotation is adjusted in relation to the fiber-air stream flow rate and the desired web thickness.

As the newly formed web is carried away from the fiber-air stream by the rotating collector drum, it may be withdrawn from the collector by some mechanical means.

EXPERIMENTS

Experiments were carried out on the production of electrostatically charged webs produced with the charged collector surface to measure the effect of charging the collector on the web filtration properties. Several properties including surface potential, filtration efficiency, and pressure drop during filtration were measured. The test equipment and materials included the following:

Meltblowing Die: 20 inch width with twenty 0.015 diameter orifices per inch; extrusion temperature: 450°–550° F.; polymer flow rate: 0.2 to 0.8 grams per minute per orifice.
  Electrodes: metal wires air flow passages (in accordance with U.S. Pat. No. 5,122,048)
  Resins: polypropylene (PP 3145 marketed by Exxon Chemical Co.)
Filtration Efficiency Measurements: The effect of electrostatic charge was determined by filtration tests using the following apparatus.
  Apparatus: Refined surgicos FET apparatus (described in "Automated Test Apparatus for Rapid Simulation for Bacterial Filtration Efficiency"; L. C. Wadsworth; 13th Technical Symposium, International Nonwovens and Disposable Assoc.; Jun. 4–6, 1985; Boston)
  Aerosol: 10% suspension of 0.8 or 0.5 micrometer latex spheres in a distilled water fog.
  Counting: optical particle counter
  Filtration Efficiency (%): (retained particles)×100 (total particles)
Electret Measurement System:
  Sample Size: 5×5 inches nonwoven web specimens
  Instrument: Keithly Electrometer Model 610C with 2.9 inch metal cone probe.
  Measurement Method: The cone probe was vertically mounted with the large diameter end upward. A plastic spacer was placed on top of the cone. The height of the spacer required to give an accurate voltage reading of a metal plate connected to a power supply was previously determined. Each web tested was placed on the plastic spacer. A grounded metal plate was then placed on the web and the test was carried out to determine surface potential.

TEST CONDITIONS AND RESULTS

Filtration efficiency tests were conducted in which the present charged collector apparatus functional as the sole charging means and these results are shown in Table 1. Test 1a is a baseline test in which no charge was applied to the collector and test 1b is the corresponding test (run just after test 1a) in which the collector was charged to a voltage of +4.0 kV. A comparison of the filtration efficiency data for tests 1a and 1b indicates that for both the 0.5 and 0.8 $\mu$m diameter particles the efficiency increases by employing the present charged collector apparatus. Tests 2a, 2b, and 2c provide similar results obtained independently from tests 1a and 1b. Test 2a is the baseline run with no charging and tests 2b and 2c are the corresponding results with the collector charged to +10.0 and −10.0 kV respectively. As before, a measurable increase in the filtration efficiency over the baseline run occurs when using the charged collector apparatus of the present invention. Furthermore, a comparison of tests 2b and 2c indicates that both positive and negative charging results in nearly the same improvement in the efficiency. The effect of collector voltage can be seen by observing that for the 0.5 $\mu$m particle case in test 1b, a collector voltage of +4.0 kV results in an increase in the filtration efficiency of 2.6% over the baseline run 1a. A similar comparison of tests 2a and 2b shows that for a collector voltage of +10.0 kV the efficiency increases 5.2% over the baseline run. Thus, increasing the charge on the collector appears to increase the filtration efficiency.

Filtration efficiency tests were conducted wherein the present charged collector apparatus was used in combination with a meltblowing die equipped with the charging system disclosed in U.S. Pat. No. 5,122,048 and these results are given in Table 2. The charging system disclosed in U.S. Pat. No. 5,122,048 operates on the principle of charging the air streams for drawing and attenuating the extruded resin fibers. The air streams are charged using charging wires fixed in both the top and bottom air flow passages within the die body. In test 3a the charging wires are charged to +4.0 kV and the collector is not charged. Test 3b is a corresponding test wherein the charging wires are charged to the same voltage as in test 3a and the collector surface is charged to +4.0 kV. A comparison of the filtration efficiency results for 3a and 3b shows an improvement in the efficiency when the charged collector surface apparatus was employed. Test 4 is a singular test in which both the charging wires and the charged collector were activated and both systems were charged to a positive polarity. The results of test 4 indicate that the combination of positively charged charging wires and positively charged collector surface yields a filter with exceptional filtration efficiency. The present invention is expected to give similar improvement in the filtration efficiency when used with other charging systems as well.

Although the present invention has been exemplified in connection with electrically charged nonwoven meltblown webs used as filters, the invention may be used to produce electrically charged webs useful in a variety of applications.

TABLE 1

Test Results with Present Charged Collector Apparatus Employed as the Sole Charging Means.

| Test | Charge on Collector (kV/mA) | DCD (in.) | Filtration Efficiency 0.5 μm/0.8 μm (%/%) | ΔP (in. H₂O) |
|---|---|---|---|---|
| 1a | 0/0 | 6 | 69.0/69.4 | 0.025 |
| 1b | 4.0/0.1 | 6 | 71.6/77.8 | 0.025 |
| 2a | 0/0 | 8 | 79.3/— | — |
| 2b | +10.0/5-.5 | 8 | 84.5/— | — |
| 2c | −10.0/5-.5 | 8 | 85.0/— | — |

DCD = die to collector distance.
pressure drop across the filter during filtration

TABLE 2

Test Results with the Present Charged Collector Apparatus used in Combination with the Wire in Airstream Charging Apparatus of U.S. Pat. No. 5,122,048

| Test | Charging Wires Top/Bottom (kV) | Charging Wires Top/Bottom (mA) | Charge on Collector (kV/mA) | DCD (in.) | Filtration Efficiency 0.5 μm/0.8 μm (%/%) | ΔP (in. H₂O) |
|---|---|---|---|---|---|---|
| 3a | 4.0/4.0 | 1.0/1.0 | 0/0 | 12 | 85.7/91.1 | 0.021 |
| 3b | 4.0/4.0 | 1.0/1.0 | −4.0/0.1 | 6 | 92.0/93.3 | 0.020 |
| 4 | 3.0/3.0 | — | +10.5/5.0 | 8 | 95.1/— | — |

DCD = die to collector distance.
pressure drop across the filter during filtration.

What is claimed is:

1. A meltblowing apparatus for electrically charging webs produced thereby which comprises
   (a) a meltblowing die for discharging a row of thermoplastic molten fibers therefrom and having air chambers formed therein;
   (b) means for discharging air from the air chambers onto each side of the row of fibers to contact the fibers and form an air-fiber stream;
   (c) a first charging means including at least one electrode mounted in an air chamber for applying a charge to the air in that air chamber prior to contacting the fibers;
   (d) a rotating collector drum for collecting the fibers; and
   (e) a second charging means mounted on the drum for charging the fibers.

2. The apparatus of claim 1 wherein the first charging means comprises two high voltage electrodes, one positioned in each air chamber for charging and ionizing the air prior to contacting the fibers.

3. The apparatus of claim 2 wherein the high voltage electrodes have positive polarity, and the second charging means has a voltage ranging from −25 kV to +25 kV.

4. The apparatus of claim 1 wherein each charging means carries a charge of −25 kV to +25 kV.

5. The apparatus of claim 1 wherein the collector drum includes an electrically conductive surface and wherein the second charging means comprises a D.C. source electrically connected to the surface.

6. The apparatus of claim 1 wherein the first and second charging means are of opposite polarity.

* * * * *